United States Patent [19]

Newburg, deceased

[11] Patent Number: 4,604,408

[45] Date of Patent: Aug. 5, 1986

[54] COMPOSITION FOR MAKING CELLULAR THERMOSET POLYMERIZED DICYCLOPENTADIENE POLYMER

[75] Inventor: Norman R. Newburg, deceased, late of Wilmington, Del., by Betty Newburg, executrix

[73] Assignee: Hercules Incorporated, Wilmington, Del.

[21] Appl. No.: 745,767

[22] Filed: Jun. 17, 1985

Related U.S. Application Data

[63] Continuation of Ser. No. 526,835, Aug. 26, 1983, Pat. No. 4,535,097.

[51] Int. Cl.$^4$ .............................. C08J 9/14; C08F 4/78
[52] U.S. Cl. ........................................ 521/91; 521/92; 521/122; 521/123; 521/139; 521/140; 521/149; 521/150; 525/211; 525/289; 526/77; 526/142; 526/169; 526/283

[58] Field of Search ................ 521/150, 122, 123, 91, 521/92, 139, 140, 149

[56] References Cited

U.S. PATENT DOCUMENTS

| | | | |
|---|---|---|---|
| 3,330,785 | 7/1967 | Boyd | 521/150 |
| 4,029,840 | 6/1977 | Shikinami et al. | 521/150 |
| 4,144,153 | 3/1979 | Shikinami et al. | 521/150 |
| 4,400,340 | 8/1983 | Klosiewicz | 524/788 |
| 4,458,037 | 7/1984 | Leach | 521/150 |
| 4,496,668 | 1/1985 | Newburg | 521/150 |
| 4,496,669 | 1/1985 | Leach | 521/150 |

*Primary Examiner*—Morton Foelak
*Attorney, Agent, or Firm*—Dale R. Lovercheck

[57] ABSTRACT

A composition for making a cellular thermoset polymer comprised of polymerized units of dicyclopentadiene monomer. The composition includes dicyclopentadiene, a catalyst, and a blowing agent.

9 Claims, No Drawings

COMPOSITION FOR MAKING CELLULAR THERMOSET POLYMERIZED DICYCLOPENTADIENE POLYMER

This application is a continuation, of application Ser. No. 526,835, filed Aug. 26, 1983, and now U.S. Pat. No. 4,535,097, issued Aug. 13, 1985.

BACKGROUND OF THE INVENTION

This invention relates to a cellular polymer of dicyclopentadiene. In particular, it relates to a cellular thermoset polymer having a density of from about 0.2 to about 0.85 g/ml.

Among the desirable physical properties for many cellular thermoset polymers is that the polymers have densities of from about 0.2 to about 0.85 g/ml. Cellular thermoset polymers having densities in this range find useful applications in electrical appliances, electronic cabinetry, furniture, sports equipment, and building and construction materials.

U.S. Pat. No. 4,400,340 discloses a thermoset poly(dicyclopentadiene) having a high modulus and a high impact strength. It does not disclose a thermoset polymer which has a cellular structure.

BRIEF DESCRIPTION OF THE PREFERRED EMBODIMENTS

Now there is found a cellular thermoset polymer comprised of polymerized units of dicyclopentadiene monomer having a density of from about 0.2 to about 0.85 g/ml. The dicyclopentadiene monomer is catalyzed with a two-part metathesis-catalyst system, the first part containing a catalyst, the second part containing an activator and at least one part containing a blowing agent.

DETAILED DESCRIPTION OF THE INVENTION

A metathesis-catalyst system which incorporates a blowing agent is employed to polymerize dicyclopentadiene monomer in such a manner that the resulting product is a cellular thermoset polymer having a density of from about 0.2 to about 0.85 g/ml. The preferred monomer is dicyclopentadiene (3a,4,7,7a-tetrahydro-4,7-methano-1H-indene).

In the preferred embodiment the cellular thermoset polymer is formed entirely from dicyclopentadiene (hereinafter referred to as DCPD) monomer. In one embodiments the cellular thermoset polymer is formed from DCPD monomer and from up to about 10% based on the weight of DCPD, of another bicyclicolefin monomer such as norbornene or norbornadiene.

The polymerization of the DCPD is catalyzed by a two part metathesis-catalyst system. One part contains a tungsten containing catalyst, such as a tungsten halide or tungsten oxyhalide, preferably $WCl_6$ or $WOCl_4$. The other part contains an activator, such as an alkylaluminum compound. Preferred alkylaluminum compounds include trialkylaluminums, alkylaluminum dichlorides and dialkylaluminum chlorides, where the alkyl group contains one to ten carbon atoms. In the most preferred activators the alkyl group is ethyl.

One part of the catalyst system comprises the tungsten containing catalyst, as described above, preferably in solution with monomer. The tungsten compound if not stabilized, will rapidly polymerize the monomer. In a preferred method of stabilizing the tungsten compound to prevent premature polymerization, a suspension is first made by adding the tungsten compound to a small amount of a suitable solvent. The solvent must not be susceptible to reacting with tungsten compound. Examples of preferred solvents are benzene, xylene, toluene, chlorobenzene, dichlorobenzene, trichlorobenzene and hexane. Sufficient solvent should be added so that the tungsten compound concentration is between about 0.1 and 0.7 mole per liter of solvent.

The tungsten compound is then made soluble in the suspension by the addition to the suspension of a small amount of an alcoholic or a phenolic compound. Phenolic compounds are preferred. Suitable phenolic compounds include phenol, alkyl-phenols, and halogen containing phenols, with tert-butyl phenol, tert-octyl phenol and nonyl phenol being most preferred. The preferred molar ratio of tungsten compound/phenolic compound is from about 1:1 to about 1:3. The tungsten compound/phenolic compound solution can be made by adding the phenolic compound to the tungsten compound suspension, stirring the resulting solution and then blowing a reactant stream of a dry inert gas through the solution to remove the hydrogen chloride which is formed. Alternatively, a phenolic salt, such as a lithium or sodium phenoxide, can be added to the tungsten compound suspension, the mixture stirred until essentially all the tungsten compound is dissolved, and the precipitated inorganic salt removed by filtration or centrifugation. All of these steps should be carried out in the absence of moisture and air to prevent deactivation of the catalyst.

Finally, to increase the shelf-life of the catalyst solution from about 1 to about 5 moles of a complexing agent such as a Lewis base or a chelating agent per mole of tungsten compound is added to the tungsten compound solution. Preferred Lewis bases include nitriles and ethers such as benzonitrile and tetrahydrofuran. Preferred chelants include acetylacetones and alkyl acetoacetates, where the alkyl group contains from one to ten carbon atoms.

The improvement in the stability and shelf-life of the tungsten compound/monomer solution is obtained whether the complexing agent is added before or after the phenolic compound is added.

The other part of the metathesis-catalyst system comprises the activator, as described above, preferably in DCPD monomer. If an unmodified alkylaluminum activator/monomer solution is mixed with the catalyst/monomer solution, the polymerization would initiate instantaneously and the polymer would set up too rapidly. The onset of polymerization can be delayed by adding a moderator to the activator/monomer solution. Ethers, esters, ketones and nitriles are representative moderators for the alkylaluminum compounds. Isopropyl ether, tetrahydrofuran and benzonitrile are typical examples of preferred moderators. Ethyl benzoate and butyl ether are most preferred. The preferred ratio of the alkylaluminum to moderator is from about 1:1.5 to about 1:5 on a molar basis.

When the catalyst system's components are combined, the resulting DCPD to tungsten compound ratio, on a molar basis, is from about 1,000:1 to about 10,000:1, preferably about 2,000:1. Also, when the catalyst system's components are combined, the resulting activator to a tungsten ratio will be from about 2:1 to about 20:1, preferably about 5:1 to about 10:1.

A blowing agent is incorporated into the catalyst system. Any of the conventional blowing agents used in reaction injection molding (hereinafter referred to as RIM) processes may be employed provided that the blowing agent does not poison or otherwise adversly effect the metathesis-catalyst system. Preferred blowing agents include low boiling organic compounds, i.e. compounds which are liquids under ambient conditions but which are volatilized when introduced into a preheated reaction vessel, and inert gases. Representative low boiling organic compounds include hydrocarbons, such as pentane and hexane, and halogenated hydrocarbons, such as methylene chloride and trichlorofluoromethane. Representative inert gases include nitrogen, argon and halogenated hydrocarbons, such as dichlorodifluoromethane.

The blowing agent is incorporated into either or both parts of the metathesis-catalyst system, or it may be added to the monomer separately. The amount of blowing agent to be incorporated is from about 2 to about 30, preferably from about 5 to about 20 percent by weight, based on the combined weight of the catalyst system and monomer. The greater the amount of blowing agent used, the less dense the final cellular thermoset polymer.

The exact amounts of catalyst, activator and blowing agent to be incorporated into a given catalyst system will depend on the particular catalyst, activator and blowing agent chosen as well as the desired final product. The amounts will be readily determinable by one skilled in the art without undue experimentation following the teachings of this specification.

The vessel in which the polymerization occurs is preheated to a temperature of from about 60° C. to about 150° C., preferably from about 100° C. to about 125° C. It has been found that the greater the temperature the less dense the final cellular thermoset polymer.

In a preferred embodiment, the polymer is made and molded with the RIM process. The two parts of the metathesis-catalyst system are each mixed with monomer and blowing agent to form two stable solutions which are placed in separate vessels. These vessels provide the source for separate reactant streams. The two reactant streams are combined in a RIM machine's mixing head and then injected into a preheated mold where they quickly polymerize into a cellular structure. It will be obvious to one skilled in the art that there may be situations where it is desirable to have monomer incorporated in just one reactant stream or to employ a plurality of reactant streams where the additional reactant streams contain monomer or additives or both.

These reactant streams are combined in the mixing head of a RIM machine. Turbulent mixing is easy to achieve because the process involves low molecular weight, rapidly diffusing components. Typically the mixing heads have orifices about 0.032 inch in diameter and a jet velocity of about 400 ft/sec. After being combined, the mixture is injected into a mold maintained from about 60° to about 150° C., preferably from about 100° to about 125° C. The mold pressure is in the range of about 10–15 psi. A rapid exothermic reaction occurs as the polymer sets up into a cellular structure having a density of from about 0.2 to about 0.85 g/ml.

In some embodiments, a nucleating agent, such as calcium carbonate, is added to at least one of the reactant streams. The nucleating agent effects the structure of the cellular structure by helping to make the cells small and uniform. Other suitable nucleating agents include talc, magnesium carbonate, barium carbonate, zinc carbonate, lead carbonate, magnesium oxide, calcium oxide, barium oxide, zinc oxide, lead oxide and silica.

In some embodiments, a preferred elastomer which is soluble in the reactant streams is added to the metathesis-catalyst system. The addition of an elastomer serves to increase the viscosity of the reactant streams and improve the impact resistance of the final product. The elastomer is dissolved in either or both of the reactant streams in an amount of from about 3 to about 15 weight percent, based on the weight of the monomer, without causing an excessive increase in the solution viscosity. Useful elastomers include natural rubber, butyl rubber, polyisoprene, polybutadiene, polyisobutylene, ethylene-propylene copolymer, styrene-butadiene-styrene triblock rubber, styrene-isoprene-styrene triblock rubber and ethylene-propylene diene terpolymers. The amount of elastomer used is determined by its molecular weight and is limited by the viscosity of the reactant streams. The reactant streams cannot be so viscous that adequate mixing is not possible. The Brookfield viscosity of DCPD is about 6 cps at 35° C. Increasing the viscosity to between about 300 cps and about 1000 cps alters the mold filling characteristics of the combined reactant streams. An example of a preferred elastomer is styrene-butadiene triblock. Where 10 wt. percent of this additive is incorporated into the streams not only is the viscosity increased to about 300 cps but the impact strength of the final product also increases. Although the elastomer can be dissolved in either one or both of the reactant streams it is desirable that it be dissolved in both. When the two reactant streams have similar viscosities more uniform mixing is obtained.

In some embodiments the reactant streams and consequently the final polymer may also contain other additives, such as fillers and plasticizers.

The best mode now contemplated of carrying out this invention is exemplified by the following working examples of preferred specific embodiments. This invention is not limited to these specific examples. All percentages are by weight, based on the weight of monomer, unless otherwise clearly indicated.

EXAMPLE 1

Example 1 illustrates a preferred embodiment of preparing cellular thermoset poly(DCPD) with a metathesis-catalyst system which incorporates hexane as a blowing agent.

In Example 1, a 10 ml syringe is capped with a rubber septum and sparged with nitrogen. 0.85 ml hexane is injected into the syringe. Then 2.0 ml of a 0.035 molar ethylaluminum ethoxy chloride solution in DCPD is injected into the syringe. Next, 2.0 ml of a 0.0035 molar solution of $WCl_6$/nonylphenol/acetylacetone, having a molar ratio of 1:1:2, in DCPD is added. The contents are mixed. Then the rubber septum is removed and replaced by a syringe plunger. The first 1 ml of the mixture is discarded and the remaining 4 ml are rapidly injected into a 25×150 mm test tube that is preheated to 75° C. The reaction mixture sets up into a cellular structure in approximately 10 seconds. The foam is removed from the test tube and its density, measured as set out in ASTM D-1612, is found to be 0.83 g/ml.

EXAMPLES 2 AND 3

Examples 2 and 3 illustrate preferred embodiments of preparing cellular thermoset poly(DCPD) with a metathesis-catalyst system which incorporates pentane as a blowing agent and a random styrene butadiene rubber as a preformed elastomer.

In each example, 2 and 3, a 10 ml syringe is capped with a rubber septum and sparged with nitrogen. 8.0 ml dicyclopentadiene, having dissolved therein 10% by weight styrene butadiene random rubber, is introduced into the syringe and the syringe is again sparged. Then 0.8 ml pentane is added and the components are mixed. A 0.5 molar solution of diethylaluminum chloride and n-butyl ether, having a 1:0.75 molar ratio, in 0.28 ml toluene is then added. Next an additional 0.2 ml of n-butyl ether is added and the contents are again mixed. Finally, a 0.1 molar solution of $WCl_6$/nonylphenol/acetylacetone, having a molar ratio of 1:1:2, in 0.28 ml toluene is added and the contents again mixed. The rubber septum is then removed and replaced by a syringe plunger. The first 2 ml of the mixture is discarded and the remaining 6 ml is rapidly injected into a 25×150 mm test tube. In Example 2 the test tube is preheated to 60° C. In Example 3 the test tube is heated to 100° C. The reaction mixtures set up into cellular thermoset polymers in approximately 10 seconds. The polymers are removed from the test tubes and their density measured as in Example 1. The density of the polymers formed in Example 2 is found to be about 0.5 g/ml and the density of the foam product formed in Example 3 is found to be about 0.2 g/ml.

EXAMPLE 4

Example 4 illustrates a preferred embodiment of preparing cellular thermoset poly(dicyclopentadiene) with a metathesis-catalyst system which incorporates pentane as a blowing agent and calcium carbonate as a nucleating agent.

In Example 4, the procedure of Examples 2 and 3 is repeated using the same materials in the same proportions except (1) 0.16 grams calcium carbonate is added to the 10 ml syringe before the syringe is capped and sparged and (2) the dicyclopentadiene does not have a preformed elastomer dissolved therein. The test tube is preheated to a temperature of 100° C. and the resulting foam product has a density of 0.33 g/ml.

EXAMPLES 5 AND 6

Examples 5 and 6 illustrate preferred embodiments of preparing cellular thermoset poly(DCPD) with a methathesis-catalyst system which incorporates pentane as a blowing agent, random styrene butadiene rubber as a preformed elastomer and calcium carbonate as a nucleating agent.

In each example, 5 and 6, the procedure of Example 4 is repeated using the same materials and the same proportions except that the dicyclopentadiene has 15% by weight of a styrene butadiene random rubber dissolved therein. In Example 5 the test tube was preheated to 60° C. and the density of the final foam product is 0.67 g/ml. In Example 6 the test tube is preheated to 100° C. and the final foam product has a density of 0.36 g/ml.

What I claim and desire to protect by Letters Patent is:

1. A cellular thermoset polymer product produced by the process comprising
   (a) providing a polymerization mixture comprising:
      dicyclopentadiene;
      a catalyst; and
      a blowing agent
      wherein said catalyst comprises a tungsten compound selected from the group consisting of a tungsten halide and a tungsten oxyhalide;
   (b) providing a heated mold;
   (c) polymerizing said polymerization mixture in said mold, to form said cellular thermoset polymer product, said polymer product comprising polymerized units of dicyclopentadiene.

2. The product of claim 1 wherein said polymerization mixture further comprises a nucleating agent.

3. The product of claim 1 further comprising a nucleating agent, wherein said nucleating agent is talc, magnesium carbonate, barium carbonate, zinc carbonate or lead carbonate.

4. The product of claim 1 further comprising a nucleating agent, wherein said nucleating agent is magnesium oxide, calcium oxide, barium oxide, zinc oxide, lead oxide or silica.

5. The product of claim 1 wherein said polymerization mixture further comprises up to about 10% based on the weight of dicyclopentadiene of another monomer selected from the group consisting of norbornene and norbornadiene, wherein said cells are small and uniform.

6. The product of claim 1 further comprising activator.

7. The product of claim 1 wherein said mold is heated to between 60° and 150° C.

8. The product of claim 1 wherein said catalyst comprises tungsten hexachloride.

9. The product of claim 1 wherein said catalyst comprises tungsten oxychloride.

* * * * *

UNITED STATES PATENT AND TRADEMARK OFFICE
CERTIFICATE OF CORRECTION

PATENT NO. : 4,604,408
DATED : August 5, 1986
INVENTOR(S) : Norman R. Newburg

It is certified that error appears in the above–identified patent and that said Letters Patent are hereby corrected as shown below:

Column 4, line 53;

"0.0035"     should read     --.035-- .

Signed and Sealed this

Twenty-first Day of October, 1986

[SEAL]

Attest:

DONALD J. QUIGG

*Attesting Officer*     *Commissioner of Patents and Trademarks*